United States Patent [19]

Igashira et al.

[11] 4,361,125

[45] Nov. 30, 1982

[54] FUEL EVAPORATOR FOR INTERNAL COMBUSTION ENGINE

[75] Inventors: Toshihiko Igashira, Toyokawa; Yasuhiko Ishida, Mishima; Ken Nomura, Okazaki; Seiko Abe, Kariya, all of Japan

[73] Assignees: Nippon Soken, Inc., Nishio; Toyota Jidosha Kogyo Kabushiki Kaisha, Toyota, both of Japan

[21] Appl. No.: 231,116

[22] Filed: Feb. 3, 1981

[30] Foreign Application Priority Data

| Feb. 6, 1980 | [JP] | Japan | 55-13325 |
| Feb. 6, 1980 | [JP] | Japan | 55-13326 |
| May 17, 1980 | [JP] | Japan | 55-65804 |
| Aug. 13, 1980 | [JP] | Japan | 55-111409 |
| Sep. 3, 1980 | [JP] | Japan | 55-122753 |
| Aug. 13, 1980 | [JP] | Japan | 55-114607[U] |

[51] Int. Cl.³ .................................................. F02M 31/00
[52] U.S. Cl. .................................. 123/549; 261/142; 219/206
[58] Field of Search ............... 123/549, 545; 261/142; 219/205, 206, 207

[56] References Cited

U.S. PATENT DOCUMENTS

| 2,668,900 | 2/1954 | Kwartz | 123/549 |
| 4,108,125 | 8/1978 | Marcoux | 123/549 |
| 4,141,327 | 2/1979 | Marcoux et al. | |
| 4,279,234 | 7/1981 | Marcoux | 123/549 |
| 4,303,050 | 12/1981 | Platzer | 123/549 |
| 4,308,845 | 1/1982 | Sarto | 123/549 |
| 4,325,344 | 4/1982 | Igashira | 123/549 |
| 4,327,697 | 5/1982 | Wada | 123/549 |

*Primary Examiner*—Ronald H. Lazarus
*Attorney, Agent, or Firm*—Cushman, Darby & Cushman

[57] ABSTRACT

A fuel evaporator comprises a metal member composed of a pipe portion and a flange portion, a heating element made of PTC ceramic, which is closely adhered to the metal member and an electric connector for electrically connecting the heating element and an electric power source. The metal member is supported by an insulating member which is interposed between an air-fuel passage and an intake manifold. The fuel film flow flowing downwards along the wall of the air-fuel passage is received by the flange portion of the metal member and is heated by the heat transmitted from the heating element. Consequently, unvaporized fuel is effectively evaporated.

11 Claims, 12 Drawing Figures

FUEL EVAPORATOR FOR INTERNAL COMBUSTION ENGINE

BACKGROUND OF THE PRESENT INVENTION

The present invention relates to a fuel evaporator installed in an air-fuel passage of an internal combustion engine, which is provided with a heating element made of ceramic material having positive temperature coefficient of resistance.

Ceramic material such as barium titanate (hereinafter will be called PTC ceramic) has such characteristics that when electrified, it generates heat and when the temperature thereof reaches a specific value (called Curie temperature), the electric resistance thereof increases rapidly. Under the Curie temperature, the PTC ceramic receives a large amount of electric current to reach the Curie temperature rapidly.

Over the Curie temperature, the electric resistance becomes remarkably large and the PTC ceramic receives only a small amount of electric current, so that the PTC ceramic is not overheated. Thus, the PTC ceramic adjusts the temperature thereof by itself into about the Curie temperature.

Therefore, by using the PTC ceramic as the heating element for promoting the evaporation of the fuel supplied into the internal combustion engine, the fuel can be heated more rapidly at a cold starting time compared with the other heating means such as exhaust gas and engine coolant.

One example of the fuel evaporator using a PTC ceramic as a heating element is shown in U.S. Pat. No. 4,141,327. In the fuel evaporator of this patent, a PTC ceramic body provided with a large number of open holes is disposed within an air-fuel passage in order to heat the whole of the air-fuel mixture passing therethrough.

One problem of the fuel evaporator of this patent so that the flowing resistance of the air-fuel mixture is increased by disposing the PTC ceramic body within the air-fuel passage. Another problem is that since the PTC ceramic body is cooled by the air passing through the air-fuel passage, the temperature of the PTC ceramic body does not rise rapidly.

Therefore, a large amount of electric power is required to make the temperature of the PTC ceramic body rise continuously.

Accordingly, one object of the present invention is to provide a fuel evaporator provided with a heating element made of PTC ceramic, which does not increase the flowing resistance of an air-fuel mixture passing through an air-fuel passage and which is not cooled by the air-fuel mixture.

Another object of the present invention is to provide a fuel evaporator of which temperature rapidly rises by a small amount of electric power.

Still another object of the present invention is to provide a fuel evaporator which effectively evaporates unvaporized fuel which flows along the wall of the air-fuel passage as a fuel film flow.

Further object of the present invention is to provide a fuel evaporator which is easily installed in the air-fuel passage.

DESCRIPTION OF THE DRAWINGS

Other objects and advantages of the invention will become apparent from the following description of embodiments with reference to the accompanying drawings wherein.

SUMMARY OF THE INVENTION

The fuel evaporator of the present invention comprises a metal member composed of a pipe portion and a flange portion which is formed in the upper end of the pipe portion, and a heating element made of PTC ceramic which is closely adhered to the outer surface of the metal member.

The pipe portion of the metal member is disposed along the air-fuel passage and the flange portion thereof is attached to the air-fuel passage.

When the unvaporized fuel which flows within the air-fuel passage passes through a throttle valve disposed within the air-fuel passage, the greater part of the unvaporized fuel is adhered to the wall of the air-fuel passage and flows downwards as a fuel film flow.

The fuel film flow is received by the flange portion of the metal member and then flows downwards along the pipe portion of the metal member.

In these processes, the unvaporized fuel is heated by the metal member to which heat is transmitted from the heating element to be evaporated.

In the fuel evaporator of the present invention, the metal member is disposed along the wall of the air-fuel passage Therefore, the flowing resistance of the air-fuel mixture is not increased and the fuel evaporator is scarcely cooled by the air-fuel mixture flowing through the air-fuel passage.

And according to the fuel evaporator of the present invention, only the fuel film flow is heated while heat is not consumed for heating the air flowing in the central portion of the air-fuel passage and the vaporized fuel.

Therefore, the unvaporized fuel can be effectively evaporated by a small amount of electric power.

Furthermore, since the fuel film flow flowing downwards along the wall of the air-fuel passage is received by the flange portion of the metal member and then is heated thereby, the fuel film flow is effectively evaporated.

DETAILED DESCRIPTION OF THE INVENTION

Hereinafter, the present invention will be explained in detail in accordance with several embodiments.

Figure 1:
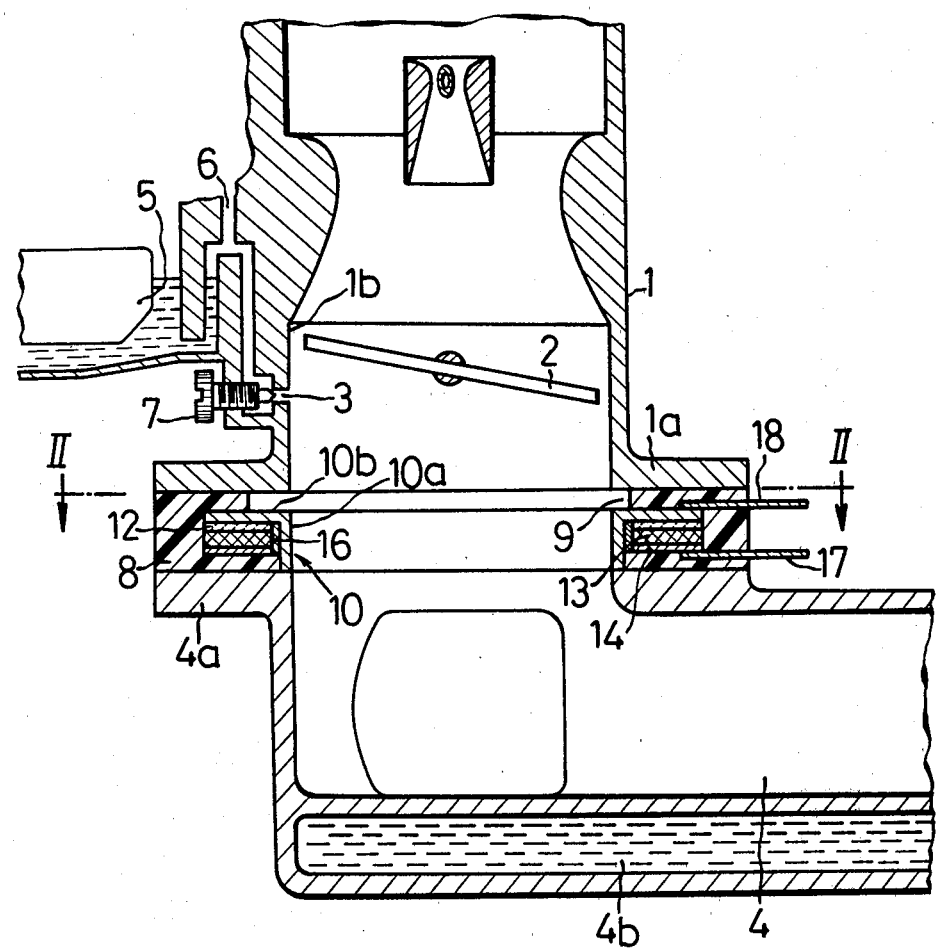
FIG. 1 is a longitudinally sectioned view of a first embodiment.
Figure 2:
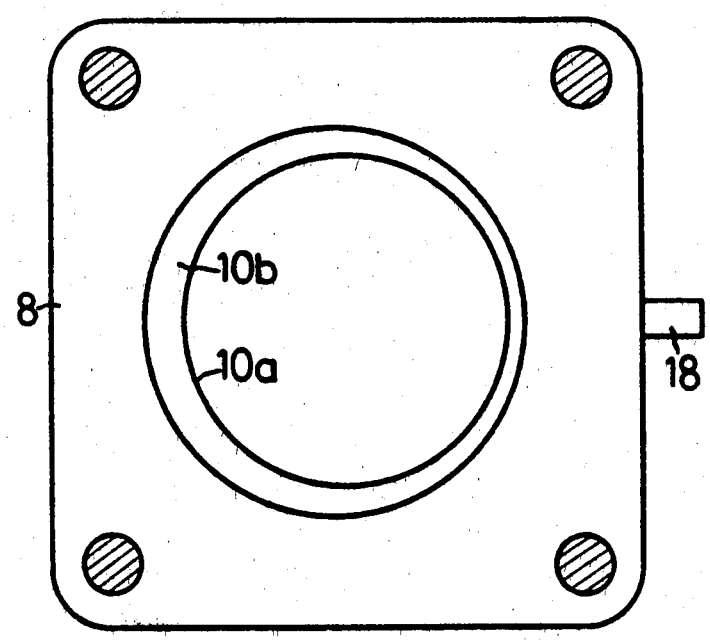
FIG. 2 is a cross sectioned view taken along the line II—II of FIG. 1.

FIG. 1 and FIG. 2 show a first embodiment. In a carbureter 1, a main nozzle (not shown) is provided on the upper stream side of a throttle valve 2 and an idle port 3 is provided on the lower stream side thereof for supplying fuel within the carbureter 1.

The fuel supplied from these nozzle and port is mixed with the air introduced within the carbureter 1 and then the air-fuel mixture is supplied to combustion chambers (not shown) of an internal combustion engine, passing through an intake manifold 4.

From the idle port 3, emulsion which is formed by mixing the fuel from a float chamber 5 and the air from an air bleed 6, is adjusted by an adjust screw 7 and is supplied within the carbureter 1.

In the lower end of the carbureter 1, a flange 1a is formed at nearly right angles to the air-fuel passage 1b thereof, and in the upper end of the intake manifold 4, a flange 4a is formed. These flanges 1a and 4a are connected to each other by bolts through an insulator 8 made of synthetic resin.

The insulator 8 supports the fuel evaporator.

A water jacket 4b is formed in the bottom portion of the intake manifold 4 for circulating engine coolant.

The fuel evaporator of the present invention is mainly composed of a metal member 10 consisting of a pipe portion 10a and a flange portion 10b which is integrally formed in the upper end of the pipe portion 10a, a heating element 12, a cushion member 13 and an electrode plate 14.

The metal member 10 is made of aluminum and has the same inner diameter as the diameter of the air-fuel passage 1b of the carbureter 1.

The heating element 12 is made of PTC ceramic which is produced by mixing barium titanate as a main ingredient with lead, manganese and the like and firing the obtained mixture.

The PTC ceramic has the Curie temperature of about 150° C. The heating element 12 shapes like a thin ring and is closely adhered to the lower surface of the flange portion 10b.

The cushion member 13 is made of stainless wool which is produced by knitting stainless steel fine wires into an annular shape, and is disposed under the heating element 12 to support it.

The cushion member 13 performs shock absorbing action and forms an electric route connected to the heating element 12.

Under the cushion member 13, an electrode plate 14 is disposed. In the outer periphery of the pipe portion 10a, an insulating member 16 made of synthetic resin is disposed.

The heating element 12, the cushion member 13 and the electrode plate 14 are electrically insulated from the pipe portion 10b by means of the insulating member 16.

The flange portion 10b, the heating element 12, the cushion member 13 and the electrode plate 14 which are disposed like layers are supported by the insulator 8 which is interposed between the carbureter 1 and the intake manifold 4.

In the upper portion of the flange portion 10b of the metal member 10, an annular groove 9 surrounded by the flange portion 10b of the metal member 10, the flange 1a of the carbureter 1 and the insulator 8 is formed.

The annular groove 9 is formed so that the axis thereof is deviated from that of the air-fuel passage 1b toward the idle port 3. The depth of the groove 9 on the side of the idle port 3 is larger than that of the other portion of the groove 9.

To the electrode plate 14, one end of the positive electrode terminal 17 is welded. The other end of the electrode terminal 17 projects outwards, penetrating through the insulator 8 and then is connected to a battery (not shown) through an ignition switch (not shown).

To the flange portion 10b, one end of the grounded electrode terminal 18 is welded and is grounded to a body of a vehicle.

When the ignition switch is turned on in order to start the engine, electric current flows from the battery into the heating element 12 through the positive electrode terminal 17, the electrode plate 14, and the cushion member 13. The heating element 12 generates heat. Then, electric current flows through the flange portion 10b and the grounded electrode terminal 18 and is grounded.

At this time, since the temperature of the heating element 12 is the same as the air temperature, the electric resistance thereof is small. Therefore, the heating element 12 receives a large amount of electric current and reaches the Curie temperature (about 150° C.) instantaneously. And over 150° C., the electric resistance of the heating element 12 is rapidly increased so that electric current is restricted. As a result, the temperature of the heating element 12 is maintained about 150° C. This heat of the heating element 12 is transmitted to the metal member 10 and the temperature of the flange portion 10b reaches about 100° C. and that of the pipe portion 10a reaches about 60° C.

When the engine is started, the air introduced into the carbureter 1, flows into the intake manifold 4 through the gap between the throttle valve 2 and the wall of the air-fuel passage 1b. And from the idle port 3, the fuel to be mixed with the air is supplied.

At this time, each temperature of the fuel, the air and the air-fuel passage 1b is not increased.

Therefore, the fuel is not sufficiently evaporated and flows along the wall of the air-fuel passage 1b as a fuel film flow. The fuel film flow flows alng the flange 1aof the carbureter 1 and flows into the annular groove 9 formed under the flange 1a.

Then, the fuel is heated by the flange portion 10b of the metal member 10 and is evaporated and the evaporated fuel flows into the intake manifold 4 together with the air.

Even if the unvaporized fuel remains, it is evaporated while flowing downwards along the pipe portion 10a.

Next, when the throttle valve 2 is opened, the fuel is mainly supplied from the main nozzle which is provided on the upper stream side of the throttle valve 2 and is mixed with the introduced air. Then, the air-fuel mixture flows into the intake manifold 4.

In this case, while the temperature of the air-fuel mixture is low, the air-fuel mixture contains unvaporized fuel having a large particle diameter. The unvaporized fuel is formed into a fuel film flow upon striking aganist the wall of the air-fuel passage 1b. This fuel film flow is also received by the flange portion 10b of the metal member 10 and is heated thereby to be evaporated.

As described above, since the metal member to which heat is transmitted from the heating element is used in the fuel evaporator of the present invention, the unvaporized fuel flowing along the metal member as a fuel film flow can be evaporated.

And the metal member for heating the unvaporized fuel is scarcely projected into the air-fuel passage 1b, the flowing resistance of the air-fuel mixture is not increased.

Furthermore, the greater part of the air-fuel mixture does not strike against the metal member so that the heat of the metal member is not taken away therefrom.

Therefore, the fuel film flow can be effectively evaporated by a small amount of electric power consumption.

And since the flange portion is formed in the upper end of the pipe portion and the groove is formed above the flange portion for receiving the fuel film flow, the fuel film flow can be affectively evaporated.

Furthermore, since the depth of the groove for receiving the fuel film flow is made larger directly below the idle port 3, the fuel can be effectively received by the flange portion 10b and evaporated at an engine starting time.

And the fuel evaporator of the present invention has a simple construction and can be easily attached to the air-fuel passage.

Figure 3:
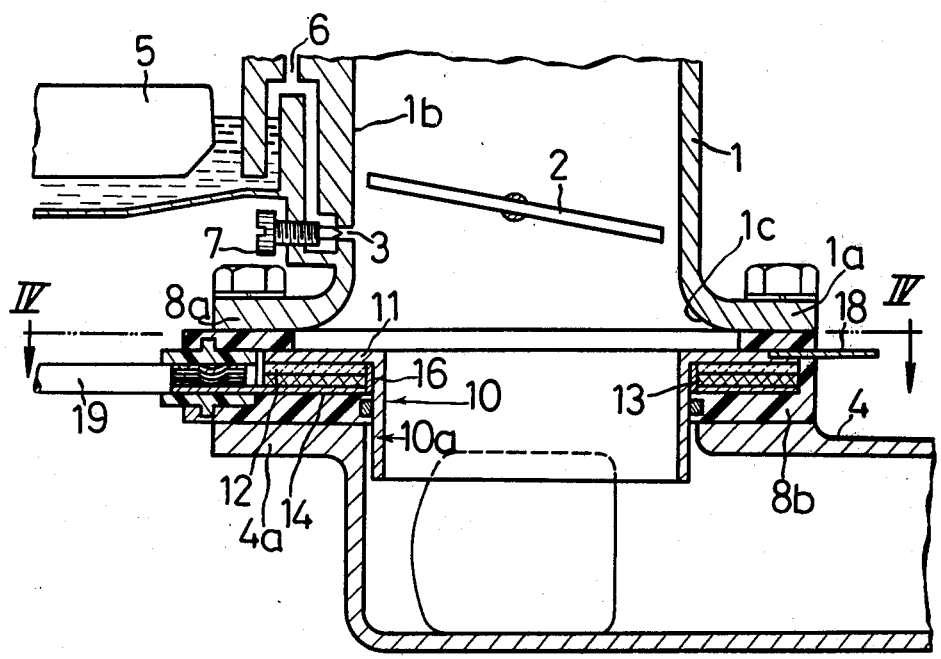
FIG. 3 is a longitudinally sectioned view of a second embodiment.
Figure 4:
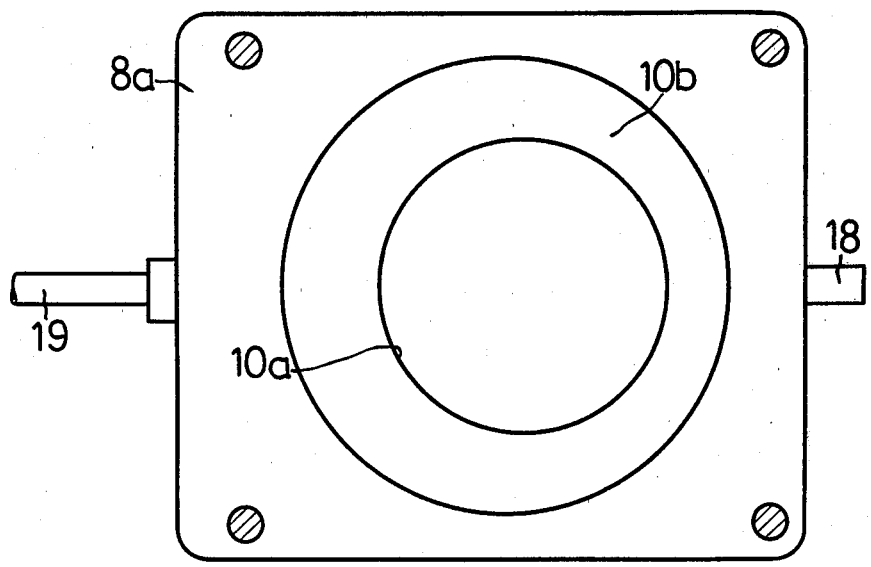
FIG. 4 is a cross sectioned view taken along the line IV—IV of FIG. 3.

FIG. 3 and FIG. 4 show a second embodiment of the present invention.

In the lower end of the carbureter 1, a flange 1a is formed. From the wall of the air-fuel passage 1b of the carbureter 1 to the flange 1a, a smoothly curved surface 1C is formed.

The flange 1a and the flange 4a of the intake manifold 4 are connected by bolts through the insulators 8a and 8b.

The insulator 8a contacted with the flange 1a is formed into an annular body of which inner diameter is larger than that of the air-fuel passage 1b.

The insulator 8b contacted with the flange 4a of the intake manifold 4 is formed into an annular body which is thicker than the insulator 8a. The inner diameter of the insulator 8b is nearly equal to the diameter of the air-fuel passage 1b.

In a stepped portion formed in the insulator 8b, the flange portion 10b of the metal member 10, the heating element 12 the cushion member 13 and the electrode plate 14 are retained.

The inner diameter of the pipe portion 10a of the metal member 10 is made slightly smaller than the diameter of the air-fuel passage 1b, and the width of the flange portion 10b exposing to the air-fuel passage 1b is made larger on the side of the idle port 3 is compared with the other portion of the flange portion 10b.

The pipe portion 10a of the metal member 10 is supported so that the axis thereof is deviated from that of the air-fuel passage 1b in the direction opposite to the idle port 3.

One end of a lead wire 19 is connected to the electrode plate 14 and the other end thereof is connected to the battery through the ignition switch.

Other construction of the fuel evaporator of the second embodiment is similar to that of the first embodiment.

In the second embodiment, by forming the wall between the wall of the air-fuel passage 1b of the carbureter 1 and the flange 1a into a smoothly curved surface 1c, the fuel film flow flowing downwards along the wall of the air-fuel passage 1b is guided by the curved surface 1c and is cirtainly received by the flange portion 10b of the metal member 10.

As a result, the fuel droplets of the fuel film flow can be prevented from flowing within the air-fuel passage 1b apart from the wall of the air-fuel passage 1b without being evaporated.

Other operation and effect are similar to those of the first embodiment.

Figure 5:
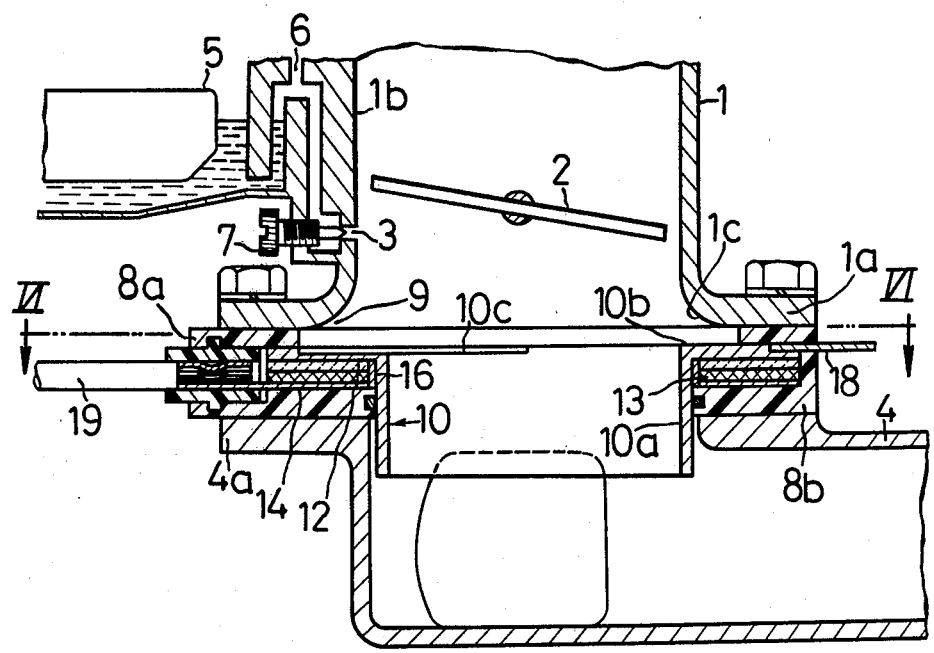
FIG. 5 is a longitudinally sectioned view of a third embodiment.
Figure 6:
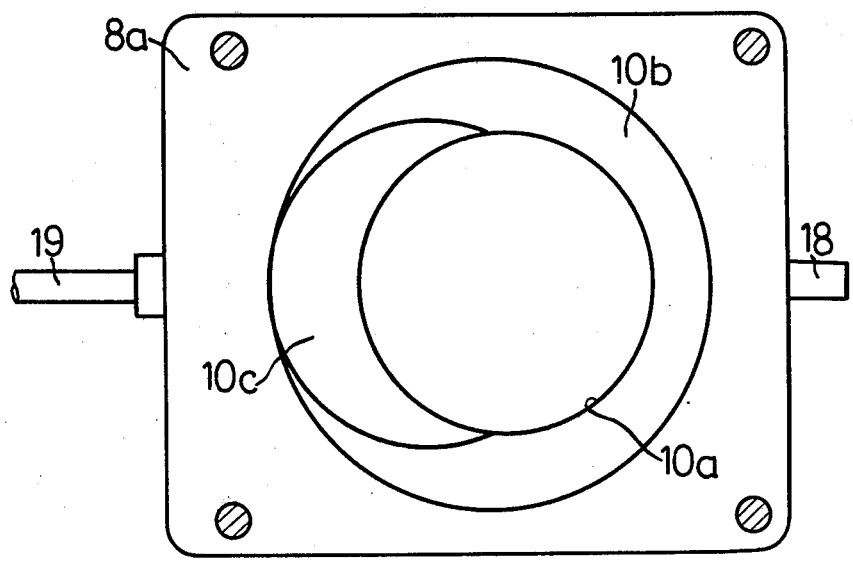
FIG. 6 is a cross sectioned view taken along the line VI—VI of FIG. 5.

FIG. 5 and FIG. 6 show a third embodiment of the present invention.

The width of the flange portion 10b of the metal member 10 which is supported between the insulators 8a and 8b is larger on the side of the idle port 3 compared with that of the other flange portion. And a crescent-shaped groove 10c is formed in the flange portion 10b having a larger width.

The thickness of the flange portion wherein the groove 10c is formed is 1 mm, for example, and the thickness of the other flange portion is 3 mm.

Other construction of the fuel evaporator of the third embodiment is substantially equal to that of the second embodiment.

In order to evaporate the fuel sufficiently, it is required to keep the temperature of the pipe member forming a heating surface about 60° C. or more.

For keeping the metal member at such a temperature as described above by heating only the flange portion thereof by the heating element, the flange portion must be made thicker.

However, the heat capacity is increased according as the increment of the thickness of the flange portion so that the temperature of the flange portion does not rise rapidly at an engine starting time.

In contrast, if the thickness of the flange portion is decreased, the temperature of the flange portion rapidly rises up to 60° C., but the temperature of the pipe portion cannot be raised up to 60° C.

In the third embodiment, a thin walled portion is locally formed in the flange portion of the metal member.

Therefore, in the thin walled portion, the temperature rapidly rise while in the other thick walled portion of the metal member, high temperature can be kept.

And by forming the thin walled portion directly below the idle port 3 from which fuel film flow is apt to flow downwards, the fuel can be sufficiently evaporated at an engine cold starting time.

Figure 7:
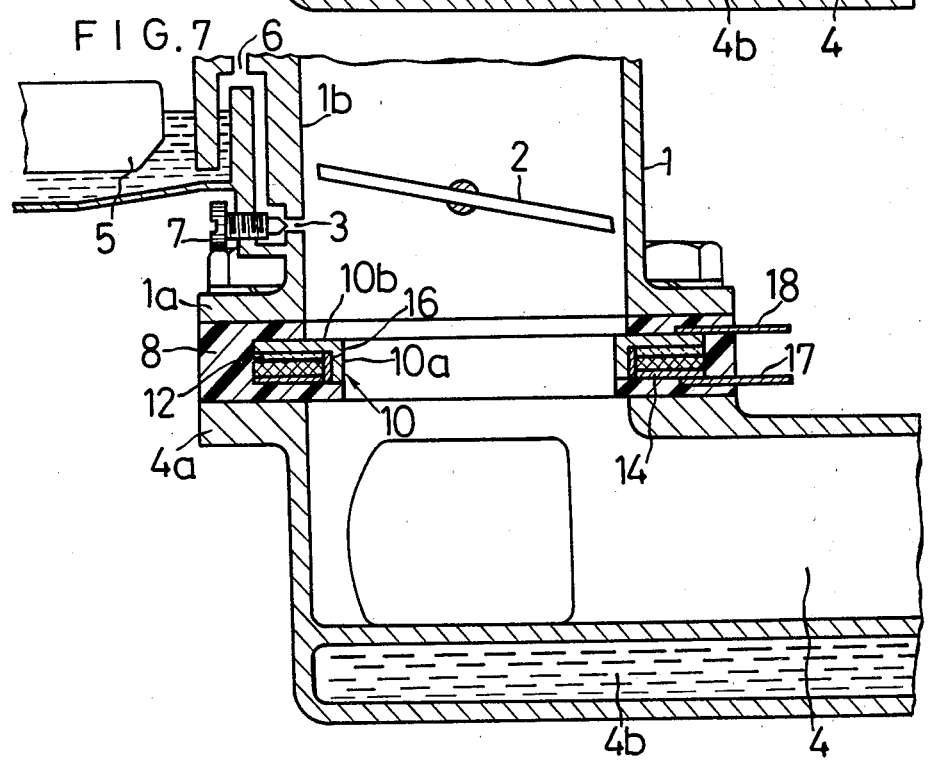
FIG. 7 is a longitudinal sectioned view of a fourth embodiment.

FIG. 7 shows a fourth embodiment of the present invention.

A fuel evaporator of the present embodiment is supported by the insulator 8 which is interposed between the flange 1a of the carbureter 1 and the flange 4a of the intake manifold 4. The inner diameter of the upper portion of the insulator 8 is equal to the diameter of the air-fuel passage 1b of the carbureter 1.

The inner diameter of the pipe portion 10a of the metal member 10 is made smaller than the diameter of the air-fuel passage 1b, and the inner diameter of the lower portion of the insulator 8, which is contacted with the lower end of the pipe portion 10a is made equal to that of the pipe portion 10a.

The upper surface of the flange portion 10b of the metal member 10 forms an annular stepped portion projecting in the direction of the axis of the air-fuel passage 1b.

The axis of the pipe portion 10a of the metal member 10 is slightly deviated from that of the air-fuel passage 1b in the direction opposite to the idle port 3. Therefore, the width of the stepped portion formed by the upper surface of the flange portion 10b is made larger on the side of the idle port 3 compared with the other flange portion 10b.

Other construction of the fourth embodiment is substantially equal to that of the first embodiment.

The fuel film flow of the unvaporized fuel flows downwards along the wall of the air-fuel passage 1b, and is received by the stepped upper surface of the flange portion 10b of the metal member 10. Then, the unvaporized fuel is heated to be evaporated.

Since the width of the stepped portion is made larger directly below the idle port 3, the fuel film flow flowing from the idle port 3 at an engine starting time, can be effectively evaporated.

Figure 8:
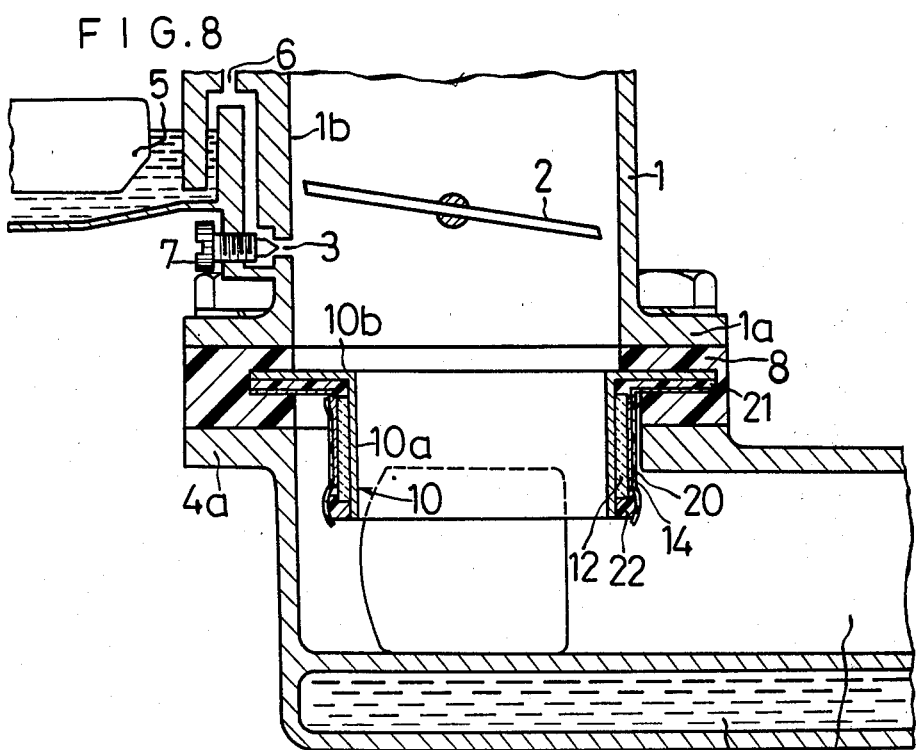
FIG. 8 is a longitudinally sectioned view of a fifth embodiment.

FIG. 8 shows a fifth embodiment of the present invention.

The fuel evaporator of the fifth embodiment comprises a metal member 10, a heating element 12 made of PTC ceramic, an electrode plate 14, a cover member 20 and an insulating members 21 and 22. The metal member 10 is composed of a pipe portion 10a and a flange portion 10b which is formed in the upper end of the pipe portion 10a. The inner diameter of the pipe portion 10a is smaller than the diameter of the air-fuel passage 1b.

A cylindrical heating element 12 made of PTC ceramic is closely fit in the outer periphery of the pipe portion 10a. The electrode plate 14 is composed of the pipe portion and the flange portion similar to the metal member 10. And the pipe portion of the electrode plate 14 is closely fit in the outer periphery of the heating element 12. Between each flange portion of the metal member 10 and the electrode plate 14, the insulating member 21 made of synthetic resin is interposed. And the annular insulating member 22 is fit in the outer periphery of the lower end of the pipe portion 10a so as to support the lower end of the heating element 12.

The pipe portion of the electrode plate 14 and the outer periphery of the insulating member 32 are covered by a tube-shaped covering member 20 made of rubber or synthetic resin having heat resistance, electric insulating property, chemical resistance against gasoline, and adiabatic property so as to be tightened thereby. The preferable material of the covering member 20 is fluoro rubber and fluoro carbon resin. In particular, fluoro carbon resin has thermal contractibility. The fluoro carbon resin contracts due to the heat of the heating element 12 to always tighten the insulating member 22 and the electrode plate 14.

It is preferable to use a plurality of axially extending pieces which are obtained by axially dividing a cylindrical PTC ceramic body as the heating element 12, and to provide a plurality of axially extending slits in one part of the pipe portion of the electrode plate 14.

By using the heating element 12 and the electrode plate 14 having the above described construction, the pipe portion 10a of the metal member 10, the heating element 12 and the pipe portion of the electrode plate 14 are firmly tightened when the covering member 20 contracts.

The metal member 10 of the fifth embodiment is supported by the insulator 8 which is interposed between the curbureter 1 and the intake manifold 4, so that the axis thereof is deviated from that of the air-fuel passage 1b.

The fuel film flow flowing downwards along the wall of the air-fuel passage 1b of the carbureter 1 is received by the flange portion 10b of the metal member 10 and is heated due to the heat transmitted from the heating member 12 to be evaporated.

And the unvaporized fuel which is not evaporated in the flange portion 10b is heated again by the pipe portion 10a to be evaporated.

According to the fifth embodiment, by using an elastic covering member 20 as means for attaching the heating element 12 and the electrode plate 14 to the metal member 10, the fuel evaporator can be easily assembled and constructed.

Figure 9:
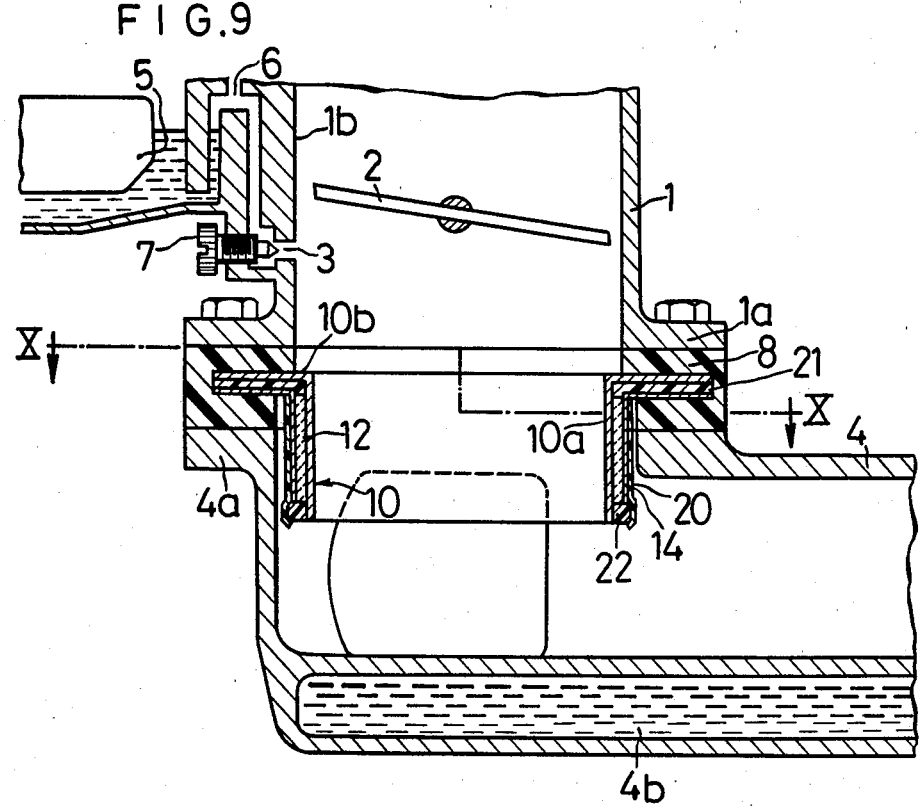
FIG. 9 is a longitudinally sectioned view of a sixth embodiment.
Figure 10:
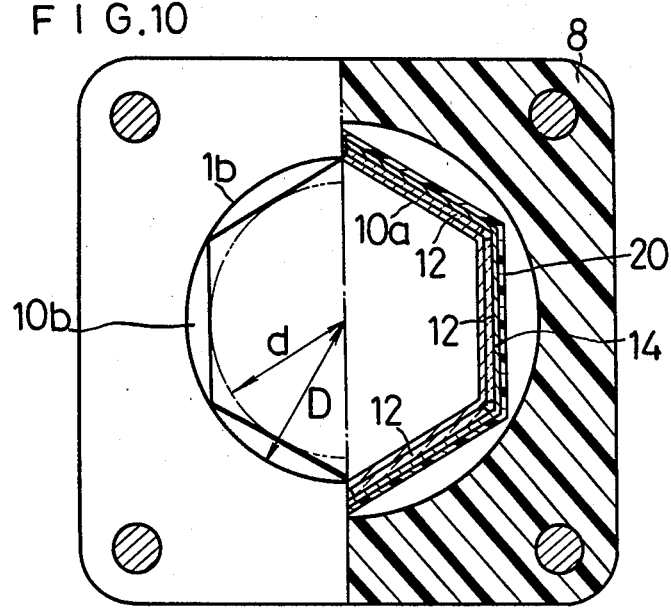
FIG. 10 is a cross sectioned view taken along the line X—X of FIG. 9.

FIG. 9 and FIG. 10 show a sixth embodiment of the present invention.

In the fuel evaporator of the sixth embodiment, the pipe portion 10a of the metal member 10 is formed so as to have a hexagonal cross sectional shape.

And six pieces of flat plate-shaped heating elements 12 are closely adhered to the six outer planes of the pipe portion 10a respectively. The outer peripheries of the heating elements 12 are closely covered by the pipe portion of the electrode plate 14 having a hexagonal cross sectional shape and then the outer periphery of the pipe portion of the electrode plate 14 is covered by the covering member 20.

Other construction of the sixth embodiment is substantially similar to that of the fifth embodiment.

In the sixth embodiment, the diameter D of the circle circumscribed with the pipe portion 10a is equal to the diameter of the air-fuel passage 1b and the diameter d of the circle inscribed with the pipe portion 10a is smaller than the diameter of the air-fuel passage 1b.

Figure 11:
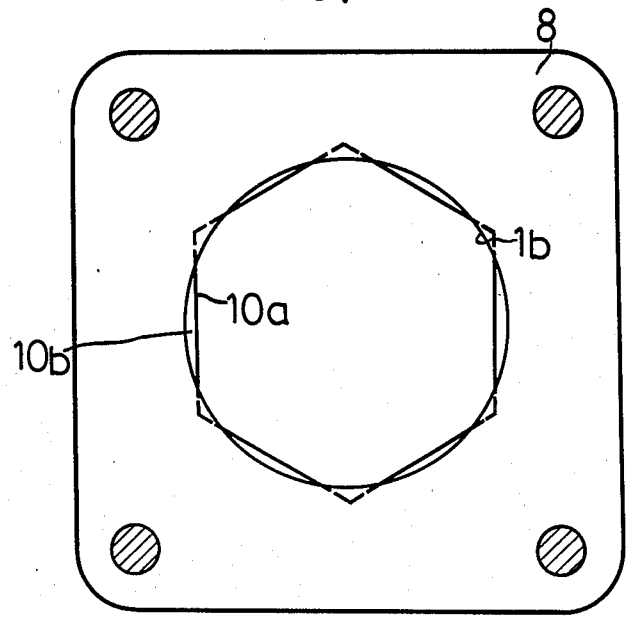
FIG. 11 and FIG. 12 show modified embodiments of the sixth embodiment respectively.

In an modified embodiment shown in FIG. 11, the diameter of the circle circumscribed with the pipe portion 10a is larger than the diameter of the air-fuel passage 1b and the diameter of the circle inscribed with the pipe portion 10a is smaller than the diameter of the air-fuel passage 1b.

Figure 12:
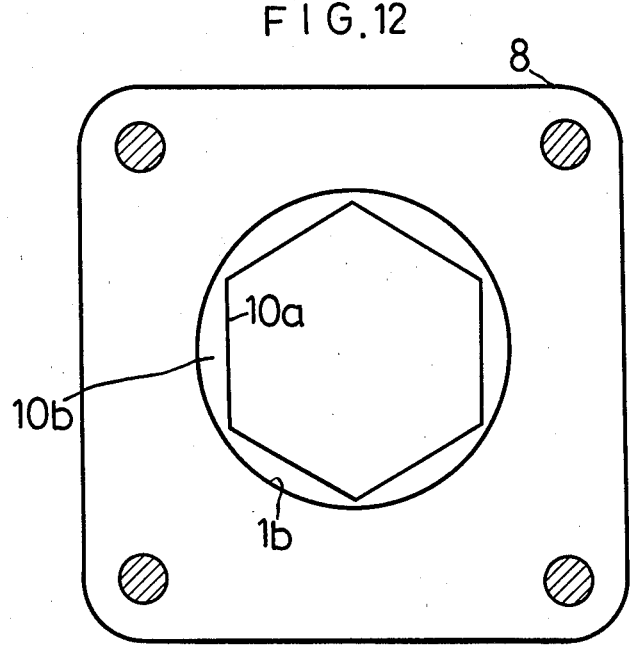

In another modified embodiment shown in FIG. 12, each diameter of the circle circumscribed with and inscribed with the pipe portion 10a is smaller than the diameter of the air-fuel passage 1b.

The fuel evaporator of the present invention can be attached to the engine provided with one carbureter. In addition, the fuel evaporator of the present invention can be also attached to a two barrel carbureter type engine. In this case, the fuel evaporator is provided on the lower atream side of a primary throttle valve.

And the fuel evaporator of the present invention can be applied to the engine of which fuel injection valve is provided on the upper stream side of the throttle valve.

As described above, according to the fuel evaporator of the present invention, the unvaporized fuel flowing downwards along the wall of the air-fuel passage can be effectively evaporated.

And the fuel evaporator of the present invention does not increase the flowing resistance of the air-fuel mixture flowing through the air-fuel passage of the carbureter.

Furthermore, since the fuel evaporator of the present invention is not cooled by the air flowing through the air-fuel passage, the temperature thereof rapidly rises to effectively evaporate the fuel at an engine cold starting time.

And in the fuel evaporator of the present invention, the heat is not consumed for heating the air flowing in the central portion of the air-fuel passage and the vaporized fuel mixed with the air. Therefore, large fuel evaporating effect can be obtained by a small amount of electric power consumption.

Having now fully described the invention, it will be apparent to one of ordinary skill in the art that many changes and modifications can be made thereto without departing from the spirit or scope of the invention as set forth herein.

What is claimed is:

1. A fuel evaporator attached between an air-fuel passage and an intake manifold, said air-fuel passage being provided with a throttle valve for adjusting the flow of the air-fuel mixture which is supplied to an engine passing through an air-fuel passage and fuel supply means for supplying fuel into said air-fuel passage, comprising:

a heat insulating member which is disposed between said air-fuel passage and said intake manifold;
a metal member including:
  a pipe portion having an inner bore and
  a flange portion which is integrally formed with said pipe portion so as to project outwards from the upper end of said pipe portion;
a heating element made of ceramic body having positive temperature coefficient of resistivity, which is closely adhered in the outer surface of said metal member;
said metal member being diaposed so that said pipe portion thereof extends along the wall of said intake manifold; and
the outer peripheral portion of said flange portion thereof being supported by said heat insulating member so that fuel film flow of unevaporated fuel which flows downwards along said wall of said air-fuel passage is received by said flange portion of said metal member.

2. A fuel evaporator according to claim 1, wherein:
the lower end of a wall of said air-fuel passage is formed into an outerwards extending flange;
the upper end of said intake manifold is formed into an outerwards extending flange; and
both flanges of said air-fuel passage and said intake manifold are connected to each other through said insulating member.

3. A fuel evaporator according to claim 2, wherein:
the inner diameter of said insulating member is made larger than the diameter of said air-fuel passage;
the inner diameter of said pipe portion of said metal member is made smaller than that of said insulating member; and
said flange portion of said metal member is supported by said insulating member under said flange of said air-fuel passage at a predetermined interval therefrom;
thereby to form an annular groove between the opposed surfaces of said flange of said air-fuel passage and said flange portion of said metal member.

4. A fuel evaporator according to claim 2, wherein:
the corner portion between the wall of said air-fuel passage and said flange of said air-fuel passage is formed into a smoothly curved surface.

5. A fuel evaporator according to claim 2, wherein:
the inner diameter of said insulating member is equal to the diameter of said air-fuel passage; and
the inner diameter of said pipe portion is formed slightly smaller than the diameter of said air-fuel passage
thereby to form an annular stepped portion which inwards projecting from said insulating member.

6. A fuel evaporator according to claim 2, wherein:
said heating element is closely adhered in the lower surface of said flange portion of said metal member;
further comprising:
a cushion member disposed under said heating element;
an electrode plate disposed under said cushion member; and
said heating element, said cushion member and said electrode plate forming a laminated body and being fit in a groove formed in said insulating member.

7. A fuel evaporator according to claim 5, wherein:
said heating element is closely adhered to the outer surface of said pipe portion;
further comprising:
an electrode plate which is disposed outside of said heating element; and
a covering member made of heat and electric insulating electric material which covers the outer surface of said electrode plate.

8. A fuel evaporator according to claim 7, wherein:
said covering member is made of fluoro rubber of fluorocarbon resin.

9. A fuel evaporator according to claim 7, wherein:
said pipe portion of said metal member has a polygonal cross sectional shape;
a plurality of flat plate shaped pieces of heating element are closely adhered to the outer surfaces of said pipe portion respectively; and
said electrode plate has a cross sectional shape corresponding to that of said pipe portion respectively.

10. A fuel evaporator according to claim 1, wherein:
said fuel supply means comprises a main nozzle for supplying fuel into said air-fuel passage on the upper stream side of said throttle valve and an idle port for supplying fuel thereinto on the lower stream side of said throttle valve;
said metal member is disposed below said idle port; and
the width of said flange portion which receives said fuel film flow is made larger directly below said idle port compared with the other portion of said flange portion.

11. A fuel evaporator according to claim 10, wherein:
said flange portion is formed thinner directly below said idle port than the other portion of said flange portion.

* * * * *